Patented June 8, 1937

2,082,887

UNITED STATES PATENT OFFICE 2,082,887

METHOD OF MAKING GYPSUM WALL PLASTER

Osborne Haydon, Port Clinton, Ohio, assignor to The American Gypsum Co., Port Clinton, Ohio, a corporation of Ohio No Drawing. Application November 15, 1935, Serial No. 49,974

3 Claims. (Cl. 106—34)

This invention relates to an improved gypsum wall plaster and method of making same. Ordinarily sand is mixed with cement plaster at the job site just previous to gauging with water for application to the wall. However, a suitable dry sand may be mill mixed with the gypsum plaster to make what is generally known to the trade as sanded wall plaster. When not mill mixed with sand the product is generally known as fibered cement plaster.

It is well known that cement plasters produced from gypsum rock with a comparatively low purity (65%-75% calcium sulphate) have ample strength and hardness but are apt to be short working, that is, when sanded with from 3 to 4 parts of sand the mechanics say the plaster is not rich and fat. The plaster works hard under the trowel, and has a tendency to roll under the darby. Plasters produced from gypsum rock with a comparatively low purity exhibit a low water carrying capacity which also contributes to their short working qualities.

It is the object of this invention to produce a rich and easy working gypsum cement plaster with a comparatively high water carrying capacity. A further object of this invention is to produce a rich working, high consistency plaster from a relatively coarsely ground stucco—70%-75% thru a 100 mesh instead of 85%-90% thru a hundred mesh as has previously been considered necessary.

I have found that by introducing a small quantity of one of the higher fatty acids into the kettle during calcination of the gypsum that the resulting stucco has its water carrying capacity increased in an amount dependent on the quantity of fatty acid employed and its chemical condition. The stucco produced is found to be slightly water repellant though not objectionably so, and this slight water repellancy has the advantage of making the plaster less susceptible to absorbing atmospheric moisture with consequent ageing in the warehouse during storage.

Cement plasters manufactured from stucco or plaster of Paris prepared according to my invention are exceptionally rich; cover the sand well; work easily under the trowel, and do not roll under the darby.

This result I believe to be due partly to the higher consistency of the stucco produced, but largely to the lubricating action of the fatty acids and small quantities of insoluble soaps formed on the interfaces between the sand and gypsum stucco. There is also a lubricating action between the face of the trowel and the plastic mass of plaster as the trowel slips more readily over plaster prepared according to my invention. The fatty acids appear to have been partially adsorbed upon the gypsum particles and partially to have reacted with some of the calcium of the gypsum to form calcium soaps.

I am aware that various soluble soaps and oils have heretofore been introduced into the kettle during calcination, but the results sought for and achieved are far different than those obtained by myself. The material sought was a casting plaster and the amount of soluble oils or soaps added are approximately a fifth to a tenth of the amount I employ. The various substances used were added to depress the surface tension of the gauging water with resultant expulsion of occluded and adsorbed air; minimization of air voids, and densifying of the cast. I have found that by the addition of fatty acids into the kettle during calcination in substantially greater amounts the results obtained are a lubricated plaster of higher than normal water carrying capacity; a somewhat less dense cast, and the same or a greater number of voids than are found in plaster not so treated.

The use of various water insoluble soaps as a waterproofing and water repelling agent has long been known particularly in the Portland cement industry where calcium and magnesium stearates have been ground into the clinker to produce waterproof cements. There are numerous proprietary waterproofing compounds on the market to be used as admixtures to the sand, water and cement for producing waterproof cements. These admixtures are largely emulsions of stearic or other fatty acids, or solutions of water insoluble soaps in suitable solvents. The emulsions of fatty acids will react with the free lime in cementitious materials in the presence of excess water to form lime soaps with their characteristic water repellent action.

Likewise the use of water repellants is not new to the gypsum art. J. P. C. Peter, research associate, in a report submitted in 1926 shows the use of calcium stearate as an integral waterproofer with gypsum plaster finish coat. The report covers panels which had already been exposed for two years. He also shows the use of various proprietary water proofers.

The gypsum wall plaster prepared and used according to my invention does not show any abnormal water repellency. When finished with lime putty white coat the speed of removal of water from the white coat is the same as for wall plasters not so prepared.

I have found that the amount of fatty acid introduced into the kettle controls the rise in consistency and the degree of lubrication of the plaster. For example: 0.055% of oleic acid based on the weight of land plaster charged into the kettle will produce the same results as 0.087% of a 75% sulphonated castor oil containing 63% fatty acids. Water solutions of the ordinary alkali soaps may be used but I have found that they are not desirable as a solution of sufficiently low viscosity containing the necessary soap require so much water as to make their use impractical. In addition the use of sodium or potassium soaps are liable to cause efflorescence in the wall with consequent poor bond.

The fatty acids used may be brought into solution in any suitable manner that will produce a solution of sufficiently low viscosity to be sprayed easily. Oleic, stearic, ricinoleic acids and their mixtures, or the other higher fatty acids may be used by dissolving in alcohol, or emulsifying in water with the aid of a little ammonia or other suitable emulsifying agent. Sulphonated animal and/or vegetable oils with a high fatty acid content may be used as they are water soluble.

I am aware that the use of saturated hydrocarbons of the methane series such as paraffin wax have been proposed to produce a high consistency gypsum stucco, but broadly I base my invention upon the use of the higher fatty acids capable of forming soaps with the alkali and alkaline earth metals, and the lubricating effect produced by their use.

The following is a description of a practical application of my invention: Eighteen pounds of oleic acid are mixed with an equal amount of alcohol and the whole emulsified in sufficient water to make 9 gallons; the most suitable emulsifying agent I have found to be ammonia. Only a small portion of ammonia is used, as when ammonia sufficient to saponify a major portion of the oleic acid is used, an unmanageable jell results which cannot be easily sprayed. The mixture is sprayed into the kettle after it is filled and has reached a temperature of approximately 250 degrees Fahrenheit. No drop in temperature is noted and the calcination proceeds normally. Or 30 pounds of sulphonated oil (75%) may be diluted with water to 9 gallons and this mixture used. The content of fatty acid is the same in each case. The amount of land plaster in the kettle is 15 tons.

The stucco produced as above outlined will have a 7–10 cc. higher consistency than normal; it will exhibit a slight water repellency when mixed neat with water, but none when sanded; it will produce a superior working mortar for use over all ordinary plaster bases.

If various salts such as sodium phosphate are added to increase the wetability of the stucco, the consistency drops about 5 points.

I claim:

1. The process of producing gypsum stucco for use in the manufacture of wall plasters comprising calcining gypsum in the presence of a higher fatty acid in amount greater than 0.05% and less than 0.2% of the uncalcined gypsum.

2. The process of making gypsum stucco for use in the manufacture of wall plaster comprising spraying gypsum during calcination with a solution containing fatty acids in amount greater than 0.05% and less than 0.2% of the gypsum.

3. The method of making a lubricated wall plaster with higher than normal water carrying capacity, comprising spraying the gypsum used in making the plaster, during calcination, with a solution of a high fatty acid in an amount greater than 0.05% and less than 0.2% of the gypsum by weight.

OSBORNE HAYDON.